March 6, 1945. H. D. KELLEY 2,370,799
TANK CONSTRUCTION
Filed Aug. 5, 1943
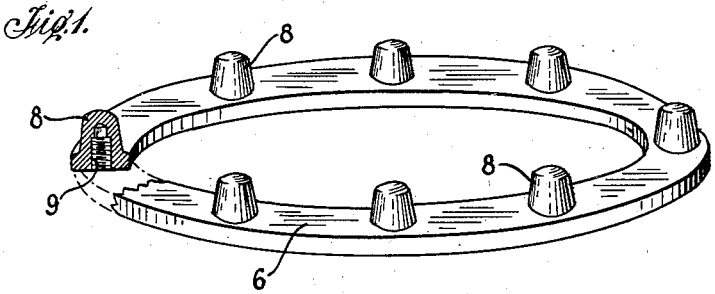
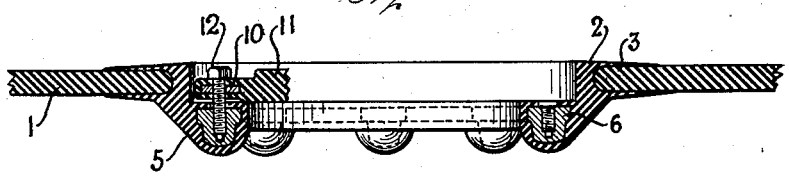
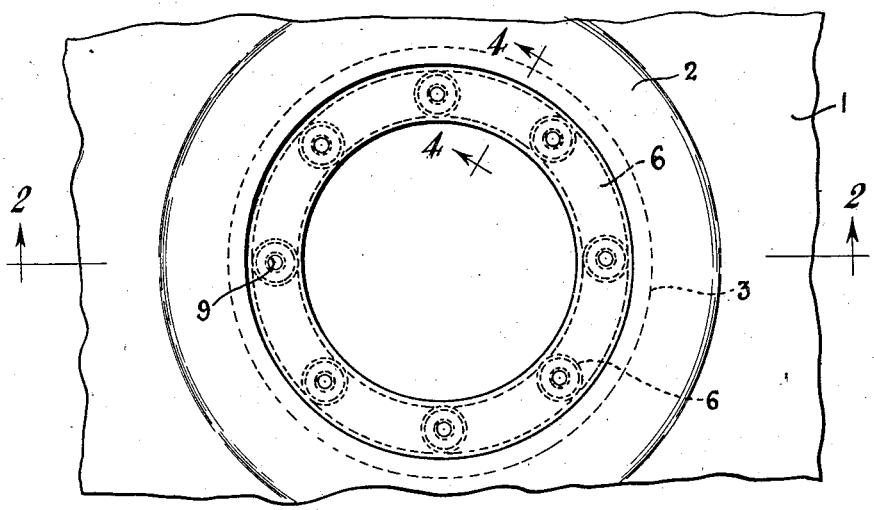
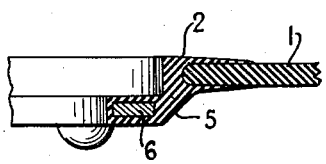
Inventor
HERBERT D. KELLEY
By Ely & Frye
Attorneys Patented Mar. 6, 1945

2,370,799

UNITED STATES PATENT OFFICE 2,370,799

TANK CONSTRUCTION

Herbert D. Kelley, Akron, Ohio

Application August 5, 1943, Serial No. 497,505

1 Claim. (Cl. 285—38)

The present invention relates to the construction of tanks, particularly gasoline and oil tanks which are employed in aircraft. Tanks for this purpose are constructed of layers of fabric and a mastic which will act as a self sealing medium for closing any bullet holes made therein. It is important in this type of tank to provide a perfect liquid seal about any openings in the tank walls, and to construct the seal so that gasoline or oil will not have any opportunity to penetrate through the attachments and particularly through any fastening means by which the adapters for the external connections are attached to the tank. In prior constructions the problem has been to provide a means for securing the various attachments which go on such a tank in such a way that all seepage of contents is prevented and it is one of the objects of this invention to provide a leak proof means for the mounting of such attachments. It is also an object of the invention to provide a new and improved insert which is embedded in the tank wall at the opening, and to which any suitable adapter may be secured.

It will be understood that in tanks for this purpose there may be many points at which openings are formed for the different attachments. Thus there is usually a filling opening and a drain or outlet, connections between several tanks of a group and connection to pumps or pressure lines. Each of these openings must be absolutely leak proof and the difficulties arising in providing leak proof connections have given rise to the present invention.

It will also be understood that while one type and size of opening only is shown in the drawing, the connections are made in various sizes and forms. It will also be appreciated that any form of adapter may be secured to the insert after it is molded in place. Variations and modifications may be incorporated in the device without departing from the invention as set forth in the appended claim.

In the drawing in which the best known form of the invention is shown:

Fig. 1 is a perspective view of the one piece metal insert which forms the anchorage for the adapter.

Fig. 2 is a cross section through a fragment of a tank wall showing the complete connection, a portion of an adapter being shown in place therein. The section is taken on the line 2—2 of Fig. 3.

Fig. 3 is a plan view of the tank at the opening.

Fig. 4 is a section on the line 4—4 of Fig. 3.

In the drawing a self-sealing tank wall is shown at 1 the details of construction of the wall not being illustrated as any standard form of self-sealing wall construction may be used. Usually this is composed of several layers of rubber-impregnated fabric and a layer of soft mastic which will flow immediately into any puncture in the wall. The wall is usually covered inside and out with a gasoline proof layer such as "neoprene" or other appropriate plastic.

Around each opening is placed a ring or fitting of gasoline proof composition indicated by the numeral 2 and having an outer groove or recess 3 in which the wall is received and securely joined. The fitting is provided with a central portion 5 usually recessed in which is located the inserted metal band or ring 6, the fitting and the insert being vulcanized together.

The insert 6 is shown in the form of a flat metal ring formed at as many such spaced points as may be desired with integral hemi-spherical dome like swellings or knobs 8. This ring is made as an integral drop-forged metal body so the complete ring is without any seams through which gasoline or oil might penetrate. After the ring is formed by the drop-forging operation a screw-threaded aperture 9 is tapped partway therein at each dome-like formation. The outer surface of the ring should then be ground or finished so as to remove any inequalities on the surface against which the adapter is applied.

After the ring is finished it is placed in a mold and the material of the fitting melded and vulcanized about the ring so that it is firmly bonded thereto. The plastic covering is applied over the domes as well as over the body of the insert.

After the tank is assembled an adapter member is secured at each opening. Such a member is indicated in Fig. 2 and usually comprises a ring 10 covered by a layer of gasoline resisting plastic 11. The adapter is held in sealed relation to the fitting by bolts 12 which enter the tapped openings 9. Any type of opening or connection may be incorporated with the adapter, and the showing thereof is omitted.

It will be seen that should any fissure form in the plastic body of the fitting the gasoline or oil cannot find its way through the body of the insert and thus out around the bolt connections as frequently happened with earlier forms of connections. A further advantage is that the cost of making these connections is greatly reduced by the use of the present invention.

What is claimed is:

In an insert for use in the manufacture of tanks, a molded plastic fitting constructed and adapted to be secured in a tank wall and having a ring embedded within the fitting to provide anchorage for an adapter, said ring consisting of a single, one piece forged metal band formed with integral domes projecting from one side of the band and screw-threaded openings tapped into the band from the side opposite the domes and extending partially into the domes.

HERBERT D. KELLEY.